United States Patent
Al-Anzi

(10) Patent No.: US 12,458,936 B1
(45) Date of Patent: Nov. 4, 2025

(54) RECYCLING OF GAS IN CONFINED PLUNGING LIQUID JET REACTOR

(71) Applicant: KUWAIT UNIVERSITY, Safat (KW)

(72) Inventor: Bader Shafaqa Al-Anzi, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 19/034,963

(22) Filed: Jan. 23, 2025

(51) Int. Cl.
| | | |
|---|---|---|
| *B01F 25/21* | (2022.01) | |
| *B01F 23/23* | (2022.01) | |
| *B01F 23/237* | (2022.01) | |
| *B01F 25/53* | (2022.01) | |
| *B01F 35/21* | (2022.01) | |
| *B01F 35/71* | (2022.01) | |
| *C02F 1/00* | (2023.01) | |
| *C02F 1/72* | (2023.01) | |
| *B01F 101/00* | (2022.01) | |

(52) U.S. Cl.
CPC ........ *B01F 25/211* (2022.01); *B01F 23/2319* (2022.01); *B01F 23/237612* (2022.01); *B01F 23/23765* (2022.01); *B01F 25/53* (2022.01); *B01F 35/21112* (2022.01); *B01F 35/2132* (2022.01); *B01F 35/7176* (2022.01); *B01F 35/718051* (2022.01); *C02F 1/008* (2013.01); *C02F 1/727* (2013.01); *B01F 2101/305* (2022.01); *C02F 2201/005* (2013.01); *C02F 2209/22* (2013.01); *C02F 2209/38* (2013.01); *C02F 2301/046* (2013.01); *C02F 2301/066* (2013.01)

(58) Field of Classification Search
None
See application file for complete search history.

(56) References Cited

U.S. PATENT DOCUMENTS

| | | | | |
|---|---|---|---|---|
| 6,145,815 | A * | 11/2000 | Cheng | ........................ C02F 7/00 261/93 |
| 2022/0176327 | A1* | 6/2022 | Al-Anzi | ................... B01F 25/53 |
| 2023/0014271 | A1* | 1/2023 | Watten | ................. A01K 63/042 |

(Continued)

OTHER PUBLICATIONS

Bader Al-Anzi, "Performance of a Novel Confined Plunging Jet Reactor Incorporating an Annular Air Lift Column", Thesis, pp. ii-xviii and 1-249, First available online Nov. 21, 2018.

(Continued)

*Primary Examiner* — Richard C Gurtowski
(74) *Attorney, Agent, or Firm* — Nath, Goldberg & Meyer; Joshua B. Goldberg

(57) ABSTRACT

A method of recycling unused gases in a water aeration process includes providing a confined plunging liquid jet reactor system; producing a water jet at an outlet of a nozzle; entraining air in the water jet as the water jet flows from the outlet of the nozzle to obtain an entrained air water jet; entraining oxygen in the entrained air water jet to obtain an entrained oxygen air water jet; flowing the entrained oxygen air water jet into a water in a fluid reservoir thereby forming small water bubbles as the entrained oxygen air water jet penetrates into the water; forming large water bubbles as the small water bubbles ascend toward the surface layer of the water; and recycling unused gases under a hood by flowing the unused gases toward the outlet of the nozzle, thereby entraining the unused gases in the entrained air water jet.

20 Claims, 5 Drawing Sheets

(56) References Cited

U.S. PATENT DOCUMENTS

2023/0018998 A1* 1/2023 Watten ............... B01F 23/2368

OTHER PUBLICATIONS

Kueng-Chang Low, "Hydrodynamics and mass transfer studies of a confined plunging jet", Thesis, pp. ii-xxi and 1-276, First available online Sep. 21, 2018.

Bader S. Al-Anzi, et al., "Measurement of Total Air Entrainment, Disentrainment and Net Entrainment Flow Rates Utilizing Novel Downcomer Incorporating Al-Anzi's Disentrainment Ring (ADR) in a Confined Plunging Jet Reactor", Water 2023, 15, 835, pp. 1-18, First available online Feb. 21, 2023.

* cited by examiner

RECYCLING OF GAS IN CONFINED PLUNGING LIQUID JET REACTOR

BACKGROUND

Field

The disclosure of the present patent application relates to a confined plunging liquid jet reactor system, and particularly to a system and a method of recycling unused gases in a water aeration process.

Description of Related Art

Confined plunging liquid jet reactors (CPLJR) have been used in different applications such as water aeration, aerobic wastewater treatment, air pollution abatement, froth flotation, and fermentation. CPLJR has also been used as a brine dispenser from desalination plants to mitigate environmental impact on coastal seawater, among other known uses.

The objective of the CPLJR is to bring two phases into contact to promote mass transfer. The CPLJR concept has been used for several decades to achieve high mass transfer rates by entraining gas bubbles into a liquid at low capital and operating costs. In comparison to conventional sparged systems, such as bubbling gas into a liquid pool, CPLJR is able to improve gas absorption rates by creating a fine dispersion of bubbles and increasing contact time between gas bubbles and water at relatively low power inputs.

One of the shortcomings of previous works in CPLJR is the optimum utilization of entrained gases, especially gases that are expensive (i.e., oxygen, nitrogen, carbon dioxide, etc.). Since the solubility of these gases (i.e., oxygen, nitrogen, carbon dioxide) is sparse, most of these gases entrained by the CPLJR system will leave the system unutilized.

Thus, a method for recycling unused gases using a confined plunging liquid jet reactor for solving the aforementioned problems is desired.

SUMMARY

The present subject matter relates to a method of recycling unused gases in a water aeration process which, in one embodiment, includes providing a confined plunging liquid jet reactor system comprising: a fluid reservoir containing water; a first outlet line in communication with a bottom of the fluid reservoir; a pump in communication with the first outlet line; a first inlet line in communication with the pump; a nozzle located at a top portion of the fluid reservoir and in communication with the first inlet line; a hood located beneath the nozzle, wherein lower ends of the hood are located at a surface layer of the water; producing a water jet at an outlet of the nozzle by recirculating the water from the first outlet line through the first inlet to the nozzle via the pump; entraining air in the water jet as the water jet flows from the outlet of the nozzle to obtain an entrained air water jet; entraining oxygen in a first portion of the entrained air water jet to obtain an entrained oxygen air water jet; flowing the entrained oxygen air water jet into the water in the fluid reservoir thereby forming small water bubbles as the entrained oxygen air water jet penetrates into the water; forming large water bubbles as the small water bubbles ascend toward the surface layer of the water; and recycling unused gases under the hood by flowing the unused gases toward the outlet of the nozzle, thereby entraining the unused gases in the entrained air water jet.

In an embodiment, each of the formed small water bubbles and the formed large water bubbles can contain undissolved air, dissolved air, undissolved oxygen, and dissolved oxygen.

In another embodiment, the formed large water bubbles can burst at the surface layer of the water, thereby releasing the undissolved air and the undissolved oxygen from the formed large water bubbles.

In an additional embodiment, the released undissolved air and the released undissolved oxygen can be contained within the hood and above the surface layer of the water.

In a supplementary embodiment, the unused gases can include the released undissolved air and the released undissolved oxygen.

In an embedment, prior to the step of entraining the oxygen in the first portion of the entrained air water jet, the method can further includes entraining nitrogen in a second portion of the entrained air water jet to obtain an entrained nitrogen air water jet; flowing the entrained nitrogen air water jet into the water in the fluid reservoir thereby forming small nitrogenous water bubbles as the entrained nitrogen air water jet penetrates into the water; forming large nitrogenous water bubbles as the small nitrogenous water bubbles ascend toward the surface layer of the water; and recycling additional unused gases under the hood by flowing the additional unused gases toward the outlet of the nozzle, thereby entraining the additional unused gases in the entrained air water jet.

In another embodiment, each of the formed small nitrogenous water bubbles and the formed large nitrogenous water bubbles can contain undissolved air, dissolved air, undissolved nitrogen, and dissolved nitrogen.

In an additional embodiment, the formed large nitrogenous water bubbles can burst at the surface layer of the water, thereby releasing the undissolved air and the undissolved nitrogen from the formed large nitrogenous water bubbles.

In a supplementary embodiment, the released undissolved air and the released undissolved nitrogen can be contained within the hood and above the surface layer of the water.

In a further embodiment, the additional unused gases can include the released undissolved air and the released undissolved nitrogen.

In an embedment, the step of entraining the nitrogen in the second portion of the entrained air water jet can be halted when all initial dissolved oxygen is removed from the water in the fluid reservoir; and thereafter the step of entraining the oxygen in the first portion of the entrained air water jet can be initiated.

In another embedment, the confined plunging liquid jet reactor system can further include an oxygen probe for measuring dissolved oxygen concentration in the water in the fluid reservoir. A first feed line can be in communication with the outlet of the nozzle via a first tapping line for supplying the nitrogen to the second portion of the entrained air water jet during the step of entraining the nitrogen. A first flow valve can be located in the first feed line for regulating a flow of the nitrogen to the second portion of the entrained air water jet. A second feed line can be in communication with the outlet of the nozzle via a second tapping line for supplying the oxygen to the first portion of the entrained air water jet during the step of entraining the oxygen. A second flow valve can be located in the second feed line for regulating a flow of the oxygen to the first portion of the entrained air water jet. The first flow valve and the second flow valve can each be in communication with the oxygen probe.

In an additional embedment, the step of entraining the nitrogen can include opening the first flow valve to allow the nitrogen in the first feed line to flow to the second portion of the entrained air water jet.

In a supplementary embodiment, the method can further include closing the first flow valve when the oxygen probe is reading a predetermined low range of oxygen thereby indicating that all of the initial dissolved oxygen is removed from the water in the fluid reservoir; and opening the second flow valve to allow the oxygen in the second feed line to flow to the first portion of the entrained air water jet during the step of entraining the oxygen.

In an embodiment, the hood can further include a first conduit and a second conduit. A first portion of the first conduit can be in communication with a top portion of the hood and a second portion of the first conduit can be in communication with a portion of the first tapping line. A first gas rotameter can be located in the first conduit between the first portion and the second portion of the first conduit. A third portion of the second conduit can be in communication with the top portion of the hood and a fourth portion of the second conduit can be in communication with a portion of the second tapping line. A second gas rotameter can be located in the second conduit between the third portion and the fourth portion of the second conduit. The first gas rotameter and the second gas rotameter can be in communication with the first flow valve and the second flow valve, respectively.

In another embodiment, the method can further include: flowing the unused gases and the additional unused gases from under the hood into the first gas rotameter and the second gas rotameter, via the first conduit and the second conduit, respectively, through the first tapping line and the second tapping line, respectively, and to the outlet of the nozzle; and regulating the flow of the nitrogen and the oxygen to the second portion and the first portion of the entrained air water jet, respectively, at the outlet of the nozzle via the first flow valve and the second flow valve, respectively, based on flowrates of the unused gases and the additional unused gases measured by the first gas rotameter and the second gas rotameter, respectively.

In a further embodiment, the present subject matter relates to a confined plunging liquid jet reactor system which, in one embodiment, includes a fluid reservoir configured to contain water; a first outlet line in communication with a bottom of the fluid reservoir; a pump in communication with the first outlet line; a first inlet line in communication with the pump; a nozzle, located at a top portion of the fluid reservoir and in communication with the first inlet line, configured to produce a water jet and entrain air in the water jet to obtain entrained air water jet at an outlet of the nozzle; a hood located beneath the nozzle, wherein lower ends of the hood are located at a surface layer of the water; an oxygen probe configured to measure dissolved oxygen concentration in the water in the fluid reservoir; a first feed line in communication with the outlet of the nozzle via a first tapping line and configured to supply nitrogen to the entrained air water jet; a first flow valve located in the first feed line configured to regulate a flow of the nitrogen to the entrained air water jet; a second feed line in communication with the outlet of the nozzle via a second tapping line and configured to supply oxygen to the entrained air water jet; and a second flow valve located in the second feed line configured to regulate a flow of the oxygen to the entrained air water jet; wherein the first flow valve and the second flow valve are each in communication with the oxygen probe.

In an embodiment, the first flow valve and the second flow valve can be configured to open and close based on dissolved oxygen concentration readings in the water in the fluid reservoir via the oxygen probe.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
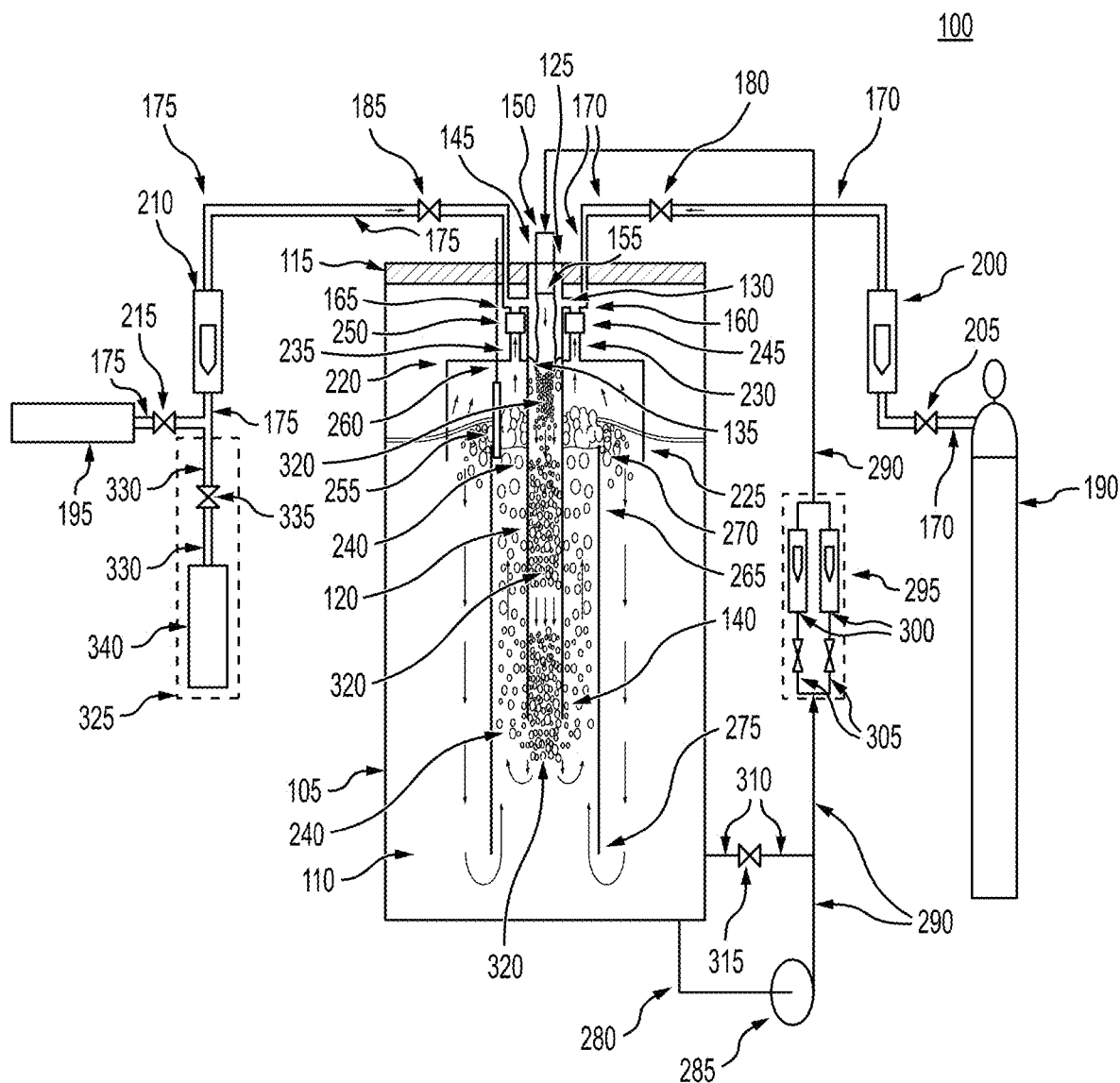
FIG. 1 depicts a confined plunging liquid jet reactor system for recycling unused gases in a water aeration process and making acidified liquid.

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

FIG. 1 depicts, in a first embodiment, a confined plunging liquid jet reactor system (100) for recycling unused gases in a water aeration process. The confined plunging liquid jet reactor system (100) can include a fluid reservoir (105) configured to contain water (110). The fluid reservoir (105) can also include a head (115) which can be configured to form a top section of the fluid reservoir (105). The fluid reservoir (105) can further include a confining tube (120) defining a hollow column positioned within the fluid reservoir (105). The confining tube (120), also known as a downcomer, can include a first portion (125), a second portion (130), a third portion (135), and a fourth portion (140), with the second portion (130) and the third portion (135) located sequentially between the first portion (125) and the fourth portion (140).

Figure 2:
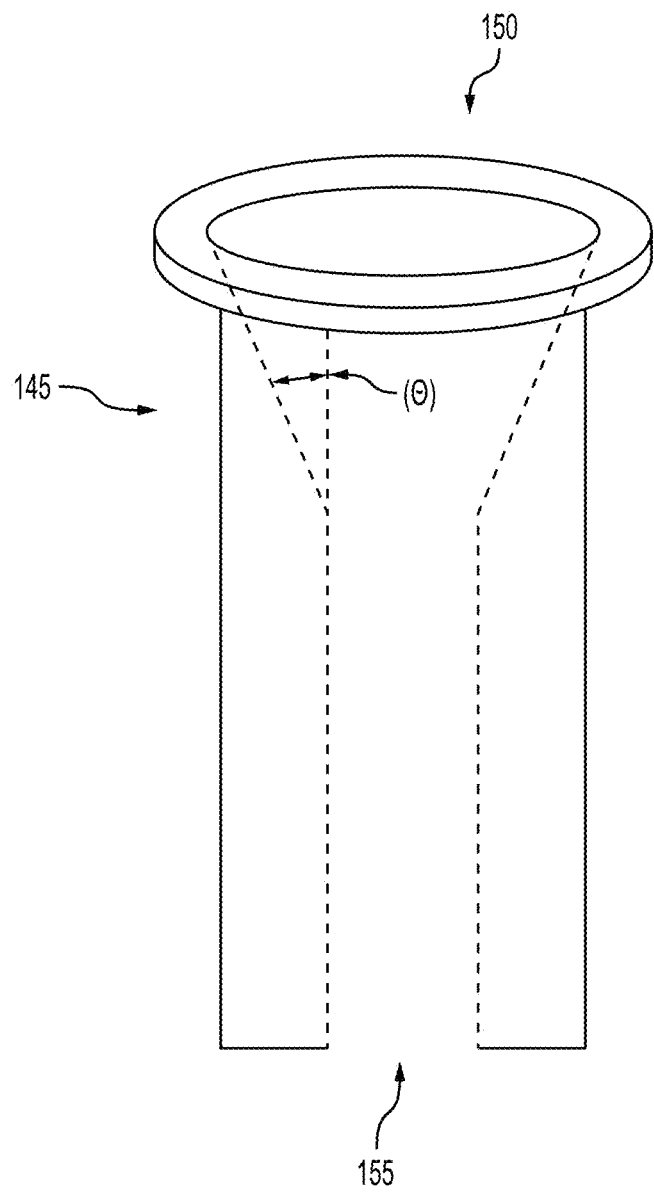
FIG. 2 depicts a conical nozzle of the confined plunging liquid jet reactor system.

In an embodiment, the first portion (125) of the confining tube (120) can be located within a portion of the head (115). A nozzle (145) can be mounted on the first portion (125) of the confining tube (120) as shown in FIG. 1. The nozzle (145) can include an inlet (150) and an outlet (155). The outlet (155) of the nozzle (145) can be configured to produce a water jet and entrain air in the water jet to obtain entrained air water jet as described herein. In a non-limiting embodiment, the nozzle (145) can be a conical nozzle as shown in FIG. 2. Near the inlet (150) of the nozzle (145), an inlet converging section can have an angle ($\Theta$) of about 45° as depicted in FIG. 2.

In another embodiment, the second portion (130) of the confining tube (120) can include two opposing orifices, a right orifice and a left orifice, which are each adjacent to the outlet (155) of the nozzle (145) as shown in FIG. 1. The right orifice and the left orifice of the second portion (130) can be in communication with a first tapping line (160) and a second tapping line (165), respectively. The first tapping line (160) and the second tapping line (165) can be in communication with a first feed line (170) and a second feed line (175), respectively. In this regard, the first feed line (170) and the second feed line (175) can be configured to supply nitrogen and oxygen, respectively, to a second portion and a first portion of the entrained air water jet, respectively, at the outlet (155) of the nozzle (145) as described herein.

In an additional embodiment, a first flow valve (180) and a second flow valve (185) can be located in the first feed line (170) and the second feed line (175), respectively, and can be configured to regulate a flow of the nitrogen and the oxygen, respectively, to the second portion and the first portion of the entrained air water jet, respectively, as described herein. The first feed line (170) and the second feed line (175) can be in communication with a nitrogen gas supply source (190) and an oxygen gas supply source (195), respectively, for supplying the respective gases thereto. The nitrogen and the oxygen from the nitrogen gas supply source (190) and the oxygen gas supply source (195), respectively, can be pressurized thereby facilitating the flow of the respective gases inside of the respective feed lines.

In a supplementary embodiment, a nitrogen rotameter (200) and a third flow valve (205) can be located in the first feed line (170), with the nitrogen rotameter (200) and the third flow valve (205) positioned sequentially between the first flow valve (180) and the nitrogen supply source (190) as depicted in FIG. 1. The third flow valve (205) can be configured to open and close thereby regulating the flow of the nitrogen inside of the first feed line (170).

In a further embodiment, an oxygen/carbon dioxide rotameter (210) and a fourth flow valve (215) can be located in the second feed line (175), with the oxygen/carbon dioxide rotameter (210) and the third flow valve (215) positioned sequentially between the second flow valve (185) and the oxygen supply source (195) as shown in FIG. 1. The fourth flow valve (215) can be configured to open and close thereby regulating the flow of the oxygen inside of the second feed line (175).

In an embodiment, the third portion (135) of the confining tube (120) can have a hood (220) attached thereto as shown in FIG. 1. The hood (220) can be located beneath the nozzle (145) with lower ends (225) of the hood (220) located at a surface layer of the water (110). The hood (220) can have a first conduit (230) and a second conduit (235) as depicted in FIG. 1. A first portion of the first conduit (230) can be in communication with a top portion of the hood (220) and a second portion of the first conduit (230) can be in communication with a portion of the first tapping line (160). A third portion of the second conduit (235) can be in communication with the top portion of the hood (220) and a fourth portion of the second conduit (235) can be in communication with a portion of the second tapping line (165). In this aspect, unused gases and additional unused gases, which are released when formed large water bubbles (240) are burst at the surface layer of the water (110) and reside under the hood (220), can be recycled by flowing the unused gases and the additional unused gases from under the hood (220) into the first conduit (230) and the second conduit (235) through the first tapping line (160) and the second tapping line (165), respectively, and toward the outlet (155) of the nozzle (145) as described herein.

Figure 3:
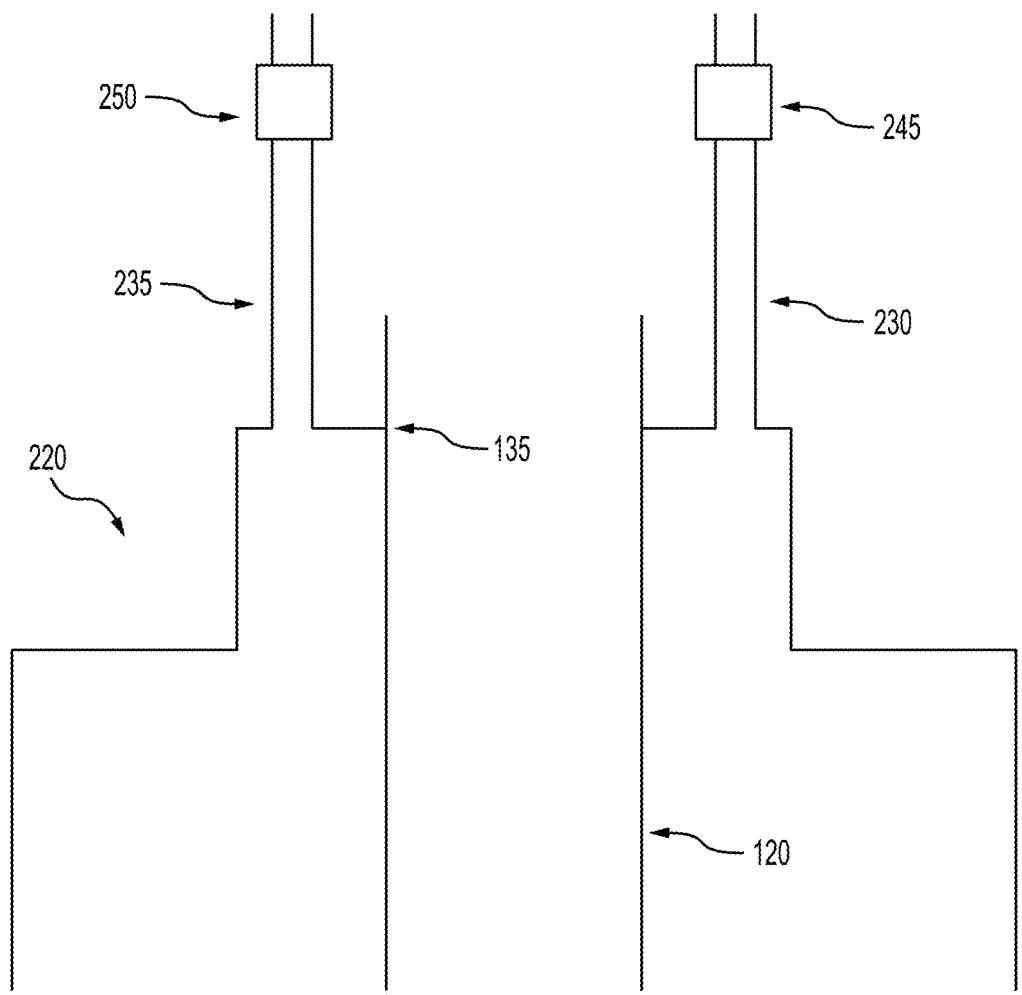
FIG. 3 depicts a stepwise shaped hood of the confined plunging liquid jet reactor system.
Figure 4:
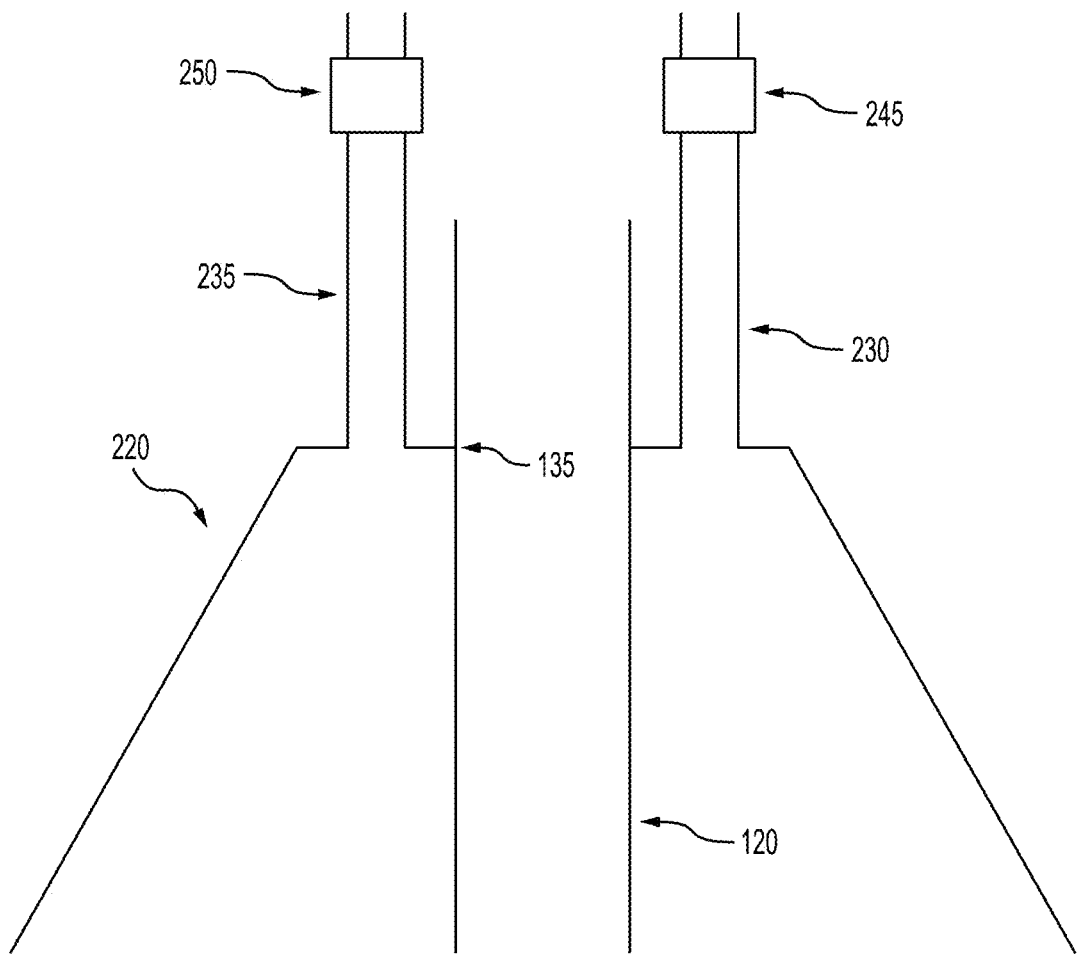
FIG. 4 depicts a trapezoidal shaped hood of the confined plunging liquid jet reactor system.

As a non-limiting example, the hood (220) can be rectangular shaped as shown in FIG. 1. Alternatively, in some non-limiting examples, the hood (220) can be stepwise shaped or trapezoidal shaped as shown in FIG. 3 and FIG. 4, respectively. It should be noted that FIGS. 3-4 share the same reference numbers as shown in FIG. 1 and therefore wherever those same reference numbers are described herein, the descriptions thereof would also apply to FIGS. 3-4, regardless of the shape of the associated hood.

In another embodiment as shown in FIG. 1, a first gas rotameter (245) can be located in the first conduit (230) between the first portion and the second portion of the first conduit (230). A second gas rotameter (250) can be located in the second conduit (235) between the third portion and the fourth portion of the second conduit (235) as depicted in FIG. 1. In a non-limiting embodiment, the first gas rotameter (245) and the second gas rotameter (250) can be configured to be in communication (via control electrical circuits (not shown)) with the first flow valve (180) and the second flow valve (185), respectively. The first gas rotameter (245) and the second gas rotameter (250) can be configured to measure flowrates of the unused gases and the additional unused gases flowing through the first conduit (230) and the second conduit (235), respectively. In this context, the first flow valve (180) and the second flow valve (185) can be configured to be automatically or manually adjusted to regulate the flow of the nitrogen and the oxygen, respectively, to the entrained air water jet at the outlet (155) of the nozzle (145) based on the measured flowrates of the unused gases and the additional unused gases measured by the first gas rotameter (245) and the second gas rotameter (250), respectively, as described herein.

In an additional embodiment, an oxygen probe (255) can be located beneath the hood (220) and at the surface of the water (110) as shown in FIG. 1. In another non-limiting embodiment, the oxygen probe (255) can be suspended from the head (115) via a suspension line (260). The oxygen probe (255) can be configured to measure dissolved oxygen concentration in the water (110) in the fluid reservoir (105) as described herein. In a further non-limiting embodiment, the first flow valve (180) and the second flow valve (185) can be configured to be in communication (via control electrical circuits (not shown)) with the oxygen probe (255). In this respect, the first valve (180) and the second valve (185) can be configured to automatically or manually adjust (i.e., fully opening, partially opening, or fully closing the first valve (180) and/or the second valve (185)) based on dissolved oxygen concentration readings in the water (110) in the fluid reservoir (105) via the oxygen probe (255) as described herein.

In a supplementary embodiment, an annular riser (265), which is a hollow column, can be configured to partially enclose the confining tube (120) and can be located beneath the hood (220) as shown in FIG. 1. The annular riser (265) can be configured to allow water from a surrounding area outside of the annular riser (265) to be entrained and mixed with the formed large water bubbles (240) leaving the fourth portion (140) of the confining tube (120) as described herein. The annular riser (265) can include a first section (270) and a second section (275). The first section (270) of the annular riser (265) can be located near the surface layer of the water (110). The second section (275) of the annular riser (265) can be located in close proximity to the fourth portion (140) of the confining tube (120).

In an embodiment, the fluid reservoir (105) can include a first outlet line (280) in communication with a bottom of the fluid reservoir (105) as shown in FIG. 1. A pump (285) can be in communication with the first outlet line (280). A first inlet line (290) can be communication with the pump (285). The inlet (150) of the nozzle (145) can be in communication with the first inlet line (290). In this regard, the nozzle (145) can be configured to produce a water jet at the outlet (155) of the nozzle (145) as described herein.

In another embodiment, a water rotameter system (295) can be located in the first inlet line (290) between the nozzle (145) and the pump (285) as depicted in FIG. 1. In certain non-limiting embodiments, the water rotameter system (295) can include one water rotameter (300) and one water valve (305). In other non-limiting embodiments, the water rotameter system (295) can include at least two water rotameters (300) and at least two water valves (305).

In an embodiment, a second outlet line (310) can be in communication with a lower side of the fluid reservoir (105) and the first inlet line (290) as shown in FIG. 1. A side valve (315) can be located in the second outlet line (310).

Pre-Water Aeration Process

In a further embodiment, the present subject matter relates to a method of recycling unused gases in a water aeration process using the above confined plunging liquid jet reactor system (100) as shown in FIG. 1. According to this embodiment, the oxygen probe (255) initially measures initial dissolved oxygen concentration (i.e., air being present in the water (110) initially prior to the water aeration process) in the water (110) in the fluid reservoir (105). If the initial dissolved oxygen concentration reading from the oxygen probe (255) is within a predetermined high range, nitrogen can be introduced into the fluid reservoir (105) to remove the initial dissolved oxygen concentration prior to the water aeration process (scenario 1). Conversely, if the initial dissolved oxygen concentration reading from the oxygen probe (255) is within a predetermined low range, oxygen can be introduced into the fluid reservoir (105) to initiate the water aeration process (scenario 2).

In this aspect, when scenario 1 is occurring, the first valve (180) for the nitrogen can be automatically or manually opened, while the second valve (185) for the oxygen is closed, to regulate the flow of the nitrogen inside of the first feed line (170) to the right orifice of the second portion (130) of the confining tube (120) thereby allowing the nitrogen to be entrained by an entrained air water jet as described herein (step 1) (hereinafter, the entrainment of the nitrogen and/or the additional unused gases (as described herein) in the entrained air water jet during the pre-water aeration process will be referred as entraining nitrogen and/or additional unused gases in "a second portion of the entrained air water jet"). Meanwhile, a water jet can be continuously produced at the outlet (155) of the nozzle (145) by continuously recirculating the water (110) from the first outlet line (280) through the first inlet line (290) to the nozzle (145) via the pump (285) (step 2). As the water jet flows from the outlet (155) of the nozzle (145), air from the surrounding area (in the headspace) adjacent to the outlet (155) of the nozzle (145) can be entrained in the water jet to obtain an entrained air water jet (step 3). As the entrained air water jet flows perpendicular to the two opposing orifices of the second portion (130) of the confining tube (120), the nitrogen flowing from the first feed line (170) and exiting the right orifice of the second portion (130) of the confining tube (120) can be entrained in the second portion of the entrained air water jet to obtain an entrained nitrogen air water jet (step 4).

In an embodiment, most of the air and the nitrogen entrained in the water jet during the entrainment steps does not dissolve in the water jet since these gases are sparingly soluble in water. In this context, the entrained nitrogen air water jet can have a large amount of undissolved air, a small amount of dissolved air, a large amount of undissolved nitrogen, and/or a small amount of dissolved nitrogen (step 4). The velocity of the entrained air water jet as it flows perpendicular to the two opposing orifices of the second portion (130) of the confining tube (120) can cause a vacuum effect thereat thereby facilitating the flow of the nitrogen through the right orifice of the second portion (130) of the confining tube (120) (step 4). The vacuum effect can also, similarly, apply to the flow of the oxygen as described herein. The velocity of the entrained air water jet can be regulated by adjusting the flowrate of the pump (285) and/or the position of the side valve (315) (i.e., partially opening or fully opening the side valve (315)).

Next, the entrained nitrogen air water jet can flow into the water (110) in the fluid reservoir (105) thereby forming small nitrogenous water bubbles (320) as the entrained nitrogen air water jet penetrates into the water (110) (step 5). Each of the formed small nitrogenous water bubbles (320) can have the large amount of undissolved air, the small amount of dissolved air, the large amount of undissolved nitrogen, and/or the small amount of dissolved nitrogen as mentioned above (step 5). The formed small nitrogenous water bubbles (320) can accumulate as they penetrate deeper into the water (110) (step 6).

At a certain depth within the water (110), the accumulated formed small nitrogenous water bubbles (320) can coalesce to form large nitrogenous water bubbles (240) (step 7). Each of the formed large nitrogenous water bubbles (240) can have the large amount of undissolved air, the small amount of dissolved air, the large amount of undissolved nitrogen, and/or the small amount of dissolved nitrogen as mentioned above (step 7). In a particular non-limiting embodiment, the large nitrogenous water bubbles (240) can be formed as the accumulated formed small nitrogenous water bubbles (320) coalesce as they exit the fourth portion (140) of the confining tube (120) and begin ascending toward the surface layer of the water (110) within the annular riser (265) as shown in FIG. 1 (step 7). As the large nitrogenous water bubbles (240) leave the fourth portion (140) of the confining tube (120) and ascend within the annular riser (265), the water (110) from the surrounding area (which has some amount of dissolved and undissolved air initially prior to the water aeration process) outside of the annular riser (265) can be entrained and mixed with the formed large nitrogenous water bubbles (240) (step 8).

As the large nitrogenous water bubbles (240) ascend within the annular riser (265) and reach the surface layer of the water (110), the large nitrogenous water bubbles (240) can burst thereby releasing the large amount of undissolved air and the large amount of undissolved nitrogen as shown in FIG. 1 (step 9). The released large amount of undissolved air and the released large amount of undissolved nitrogen can be contained within the hood (220) and above the surface layer of the water (110) (hereinafter the released undissolved air and the released undissolved nitrogen will be referred as "additional unused gases") (step 9).

In an embodiment, the additional unused gases within the hood (220) can be recycled by flowing the additional unused gases toward the outlet (155) of the nozzle (145) thereby entraining the additional unused gases in the entrained air water jet as shown in FIG. 1. In this context, the additional unused gases can rise within the hood (220) and flow through the first conduit (230) and the second conduit (235) via the first portion and the third portion, respectively (step 10). As the additional unused gases flow toward the second portion and the fourth portion of the first conduit (230) and the second conduit (235), respectively, the additional unused gases can also flow through the first gas rotameter (245) and the second gas rotameter (250) within the first conduit (230) and the second conduit (235), respectively (step 11).

The flowrates of the additional unused gases can be measured by the first gas rotameter (245) and the second gas rotameter (250) (step 11). In this respect, the first flow valve (180) can be automatically or manually adjusted to regulate the flow of the nitrogen to the second portion of the entrained air water jet at the outlet (155) of the nozzle (145) based on the measured flowrates by the first gas rotameter (245) and the second gas rotameter (250) (step 12). In some non-limiting embodiments, the flow of the nitrogen through the first feed line (170) to the entrained air water jet can be decreased or eliminated via automatic adjustment of the first flow valve (180) based on high flowrate readings from the first gas rotameter (245) and the second gas rotameter (250) (step 12). Conversely, in other non-limiting embodiments, the flow of the nitrogen through the first feed line (170) to the entrained air water jet can be increased via automatic adjustment of the first flow valve (180) based on low flowrate readings from the first gas rotameter (245) and the second gas rotameter (250) (step 12). In this regard, nitrogen usage from the nitrogen gas supply source (190) can be optimized.

After the additional unused gases flow past the second portion and the fourth portion of the first conduit (230) and the second conduit (235), respectively, the additional unused gases can flow toward the second portion of the entrained air water jet at the outlet (155) of the nozzle (145) via the respective opposing orifices of the second portion (130) of the confining tube (120), the first tapping line (160), and the second tapping line (165) (step 13). In this aspect, the additional unused gases are entrained in the second portion of the entrained air water jet to obtain an entrained additional unused gases air water jet as the entrained air water jet flows perpendicular to the two opposing orifices of the second portion (130) of the confining tube (120) (step 13). As a result, the concentrations of dissolved nitrogen and dissolved air are further increased in the second portion of the entrained air water jet (step 13). The recycling of the additional unused gases can also minimize or eliminate the need to supply additional nitrogen to the second portion of the entrained air water jet from the first feed line (170) thereby minimizing operation costs. The entrained additional unused gases air water jet can have a large amount of undissolved air, a small amount of dissolved air, a large amount of undissolved nitrogen, and/or a small amount of dissolved nitrogen (step 13). Subsequently, steps 5-13 can be repeated continuously for the entrained additional unused gases air water jet until the dissolved oxygen concentration reading from the oxygen probe (255) is within the predetermined low range, which indicate that all of the initial dissolved oxygen is removed from the water (110) in the fluid reservoir (105) (step 14).

Water Aeration Process

If the predetermined low range has been reached, the water aeration process can be initiated by automatically or manually closing the first flow valve (180) and automatically or manually opening the second flow valve (185) to stop the flow of the nitrogen and start the flow of the oxygen, respectively, to the entrained air water jet at the outlet (155) of the nozzle (145) (step 15) (hereinafter, the entrainment of the oxygen and/or the unused gases (as described herein) in the entrained air water jet during the water aeration process will be referred as entraining oxygen and/or unused gases in "a first portion of the entrained air water jet"). Specifically, as the entrained air water jet flows perpendicular to the two opposing orifices of the second portion (130) of the confining tube (120), the oxygen flowing through the second feed line (175) and exiting the left orifice of the second portion (130) of the confining tube (120) can be entrained in the first portion of the entrained air water jet to obtain an entrained oxygen air water jet (step 15). The entrained oxygen air water jet can have a large amount of undissolved air, a small amount of dissolved air, a large amount of undissolved oxygen, and/or a small amount of dissolved oxygen (step 15). The velocity of the entrained air water jet as it flows perpendicular to the two opposing orifices of the second portion (130) of the confining tube (120) can cause a vacuum effect thereat thereby facilitating the flow of the oxygen through the left orifice of the second portion (130) of the confining tube (120) (step 15). The velocity of the entrained air water jet can be regulated by adjusting the flowrate of the pump (285) and/or the position of the side valve (315) (i.e., partially opening or fully opening the side valve (315)).

Next, the entrained oxygen air water jet can flow into the water (110) within the confining tube (120) in the fluid reservoir (105) thereby forming small water bubbles (320) as the entrained oxygen air water jet penetrates into the water (110) (step 16). Each of the formed small water bubbles (320) can have the large amount of undissolved air, the small amount of dissolved air, the large amount of undissolved oxygen, and/or the small amount of dissolved oxygen as mentioned above (step 16). The formed small water bubbles (320) can accumulate as they penetrate deeper into the water (110) (step 17).

It was unexpectedly discovered that, in an embodiment, when the diameters of the nozzle (145) and the confining tube (120) are small, higher aeration can be achieved (i.e., water aeration efficiency can be increased). Likewise, when total jet length (i.e., total lengths of the entrained air jet and the entrained oxygen air water jet from the outlet (155) of the nozzle (145) to the surface layer of the water (110)) is longer, higher aeration can be achieved before the entrained oxygen air water jet breaks into droplets as it penetrates into the water (110) as described in step 16.

At a certain depth within the water (110), the accumulated formed small water bubbles (320) can coalesce to form large water bubbles (240) (step 18). Each of the formed large water bubbles (240) can have the large amount of undissolved air, the small amount of dissolved air, the large amount of undissolved oxygen, and/or the small amount of dissolved oxygen as mentioned above (step 18). In a particular non-limiting embodiment, the large water bubbles (240) can be formed as the accumulated formed small water bubbles (320) coalesce as they exit the fourth portion (140) of the confining tube (120) and begin ascending toward the surface layer of the water (110) within the annular riser (265) as shown in FIG. 1 (step 18). As the large water bubbles (240) leave the fourth portion (140) of the confining tube (120) and ascend within the annular riser (265), the water (110) from the surrounding area (which is unaerated water (i.e., all of the initial dissolved oxygen is removed from the water (110) in the fluid reservoir (105)) prior to the water aeration process) outside of the annular riser (265) can be entrained and mixed with the formed large water bubbles (240) (step 19). In this regard, the dissolved oxygen concentration in the formed large water bubbles (240) and the water (110) within the annular riser (265) can be reduced during the entraining and mixing step. As a result, the dissolved oxygen concentration driving force can be restored thereby allowing more oxygen to be dissolved.

As the large water bubbles (240) ascend within the annular riser (265) and reach the surface layer of the water (110), the large water bubbles (240) can burst thereby releasing the large amount of undissolved air and the large amount of undissolved oxygen (step 20). The released large amount of undissolved air and the released large amount of undissolved oxygen can be contained within the hood (220) and above the surface layer of the water (110) (hereinafter the released undissolved air and the released undissolved oxygen will be referred as "unused gases") (step 20).

In an embodiment, the unused gases within the hood (220) can be recycled by flowing the unused gases toward the outlet (155) of the nozzle (145) thereby entraining the unused gases in the entrained air water jet as shown in FIG. 1. In this aspect, the unused gases can rise within the hood (220) and flow through the first conduit (230) and the second conduit (235) via the first portion and the third portion, respectively (step 21). As the unused gases flow toward the second portion and the fourth portion of the first conduit (230) and the second conduit (235), respectively, the unused gases can also flow through the first gas rotameter (245) and the second gas rotameter (250) within the first conduit (230) and the second conduit (235), respectively (step 22).

The flowrates of the unused gases can be measured by the first gas rotameter (245) and the second gas rotameter (250) (step 22). In this context, the second flow valve (185) can be automatically or manually adjusted to regulate the flow of the oxygen to the first portion of the entrained air water jet at the outlet (155) of the nozzle (145) based on the measured flowrates by the first gas rotameter (245) and the second gas rotameter (250) (step 23). In some non-limiting embodiments, the flow of the oxygen through the second feed line (175) to the entrained air water jet can be decreased or eliminated via automatic adjustment of the second flow valve (185) based on high flowrate readings from the first gas rotameter (245) and the second gas rotameter (250) (step 23). Conversely, in other non-limiting embodiments, the flow of the oxygen through the second feed line (175) to the entrained air water jet can be increased via automatic adjustment of the second flow valve (185) based on low flowrate readings from the first gas rotameter (245) and the second gas rotameter (250) (step 23). In this respect, oxygen usage from the oxygen gas supply source (195) can be optimized.

After the unused gases flow pass the second portion and the fourth portion of the first conduit (230) and the second conduit (235), respectively, the unused gases can flow toward the first portion of the entrained air water jet at the outlet (155) of the nozzle (145) via the respective opposing orifices of the second portion (130) of the confining tube (120), the first tapping line (160), and the second tapping line (165) (step 24). In this regard, the unused gases can be entrained in the first portion of the entrained air water jet to obtain an entrained unused gases air water jet as the entrained air water jet flows perpendicular to the two opposing orifices of the second portion (130) of the confining tube (120) (step 24). As a result, the concentrations of dissolved oxygen and dissolved air are further increased in the entrained air water jet (step 24). The recycling of the unused gases can also minimize or eliminate the need to supply additional oxygen to the entrained air water jet from the second feed line (175), thereby minimizing operation costs. The entrained unused gases air water jet can have a large amount of undissolved air, a small amount of dissolved air, a large amount of undissolved oxygen, and/or a small amount of dissolved oxygen (step 24). Subsequently, steps 16-24 can be repeated continuously for the entrained unused gases air water jet until the dissolved oxygen concentration reading from the oxygen probe (255) is at a predetermined dissolved oxygen concentration, which indicate that the water (110) in the fluid reservoir (105) has been aerated at a desired amount (step 25). In a non-limiting embodiment, the predetermined dissolved oxygen concentration can be at about 9 ppm at about 20° C.

If the predetermined dissolved oxygen concentration has been reached, the second flow valve (185) can be automatically or manually turned off thereby preventing the flow of the oxygen to the entrained air water jet at the outlet (155) of the nozzle (145) (step 26). Subsequently, the flow of the water (110) from the first outlet line (280) and the second outlet line (310) can be stopped to prevent the water jet from forming at the outlet (155) of the nozzle (145) (step 27).

Process of Making Acidified Liquid

In a further alternative embodiment, the present subject matter relates to a method of making acidified liquid using a modified version of the above confined plunging liquid jet reactor system (100) as shown in FIG. 1. In this regard, the confined plunging liquid jet reactor system (100) can be modified by incorporating a carbon dioxide system (325) at a portion of the second feed line (175) between the oxygen/carbon dioxide rotameter (210) and the fourth flow valve (215) as depicted in FIG. 1. The carbon dioxide system (325) can include a third feed line (330) connecting to the portion of the second feed line (175), a fifth flow valve (335) in the third feed line (330), and a carbon dioxide supply source (340) that can be connected to the third feed line (330).

The method of making acidified liquid can include closing the first valve (180) and the fourth valve (215) to prevent the flow of nitrogen and oxygen through the first feed line (170) and the second feed line (175), respectively (step 28). Next, the fifth flow valve (335) and the second valve (185) can be opened to regulate the flow of carbon dioxide inside of the third feed line (330), which then flows to the second feed line (175) and eventually to the left orifice of the second portion (130) of the confining tube (120) thereby allowing the carbon dioxide to be entrained by an entrained air water jet as described herein (step 29). Meanwhile, a water jet can be continuously produced at the outlet (155) of the nozzle (145) by continuously recirculating the water (110) from the first outlet line (280) through the first inlet line (290) to the nozzle (145) via the pump (285) (step 30). As the water jet flows from the outlet (155) of the nozzle (145), air from the surrounding area (in the headspace) adjacent to the outlet (155) of the nozzle (145) can be entrained in the water jet to obtain an entrained air water jet (step 31). As the entrained air water jet flows perpendicular to the two opposing orifices of the second portion (130) of the confining tube (120), the carbon dioxide flowing from the second feed line (175) and exiting the left orifice of the second portion (130) of the confining tube (120) can be entrained in the entrained air water jet to obtain an entrained carbon dioxide air water jet (step 32).

In an embodiment, most of the air and the carbon dioxide during the entrainment steps does not dissolve in the water jet since these gases are sparingly soluble in water. In this aspect, the entrained carbon dioxide air water jet can have a large amount of undissolved air, a small amount of dissolved air, a large amount of undissolved carbon dioxide, and/or a small amount of dissolved carbon dioxide (step 33). The velocity of the entrained air water jet as it flows perpendicular to the two opposing orifices of the second portion (130) of the confining tube (120) can cause a vacuum effect thereat thereby facilitating the flow of the carbon dioxide through the left orifice of the second portion (130) of the confining tube (120) (step 33). The velocity of the entrained air water jet can be regulated by adjusting the flowrate of the pump (285) and/or the position of the side valve (315) (i.e., partially opening or fully opening the side valve (315)).

Next, the entrained carbon dioxide air water jet can flow into the water (110) in the fluid reservoir (105) thereby forming small carbon dioxide water bubbles (320) as the entrained carbon dioxide air water jet penetrates into the water (110) (step 34). Each of the formed small carbon dioxide water bubbles (320) can have the large amount of undissolved air, the small amount of dissolved air, the large amount of undissolved carbon dioxide, and/or the small amount of dissolved carbon dioxide as mentioned above (step 34). The formed small carbon dioxide water bubbles (320) can accumulate as they penetrate deeper into the water (110) (step 35).

At a certain depth within the water (110), the accumulated formed small carbon dioxide water bubbles (320) can coalesce to form large carbon dioxide water bubbles (240) (step 36). Each of the formed large carbon dioxide water bubbles (240) can have the large amount of undissolved air, the small amount of dissolved air, the large amount of undissolved carbon dioxide, and/or the small amount of dissolved carbon dioxide as mentioned above (step 36). In a particular non-limiting embodiment, the large carbon dioxide water bubbles (240) can be formed as the accumulated formed small carbon dioxide water bubbles (320) coalesce as they exit the fourth portion (140) of the confining tube (120) and begin ascending toward the surface layer of the water (110) within the annular riser (265) as shown in FIG. 1 (step 36). As the large carbon dioxide water bubbles (240) leave the fourth portion (140) of the confining tube (120) and ascend within the annular riser (265), the water (110) from the surrounding area (which has some amount of dissolved and undissolved air initially prior to the water aeration process) outside of the annular riser (265) can be entrained and mixed with the formed large carbon dioxide water bubbles (240) (step 37).

As the large carbon dioxide water bubbles (240) ascend within the annular riser (265) and reach the surface layer of the water (110), the large carbon dioxide water bubbles (240) can burst thereby releasing the large amount of undissolved air and the large amount of undissolved carbon dioxide as shown in FIG. 1 (step 38). The released large amount of undissolved air and the released large amount of undissolved carbon dioxide can be contained within the hood (220) and above the surface layer of the water (110) (hereinafter the released undissolved air and the released undissolved carbon dioxide will be referred as "secondary unused gases") (step 38).

In an embodiment, the secondary unused gases within the hood (220) can be recycled by flowing the secondary unused gases toward the outlet (155) of the nozzle (145) thereby entraining the secondary unused gases in the entrained air water jet as shown in FIG. 1. In this regard, the secondary unused gases can rise within the hood (220) and flow through the first conduit (230) and the second conduit (235) via the first portion and the third portion, respectively (step 39). As the secondary unused gases flow toward the second portion and the fourth portion of the first conduit (230) and the second conduit (235), respectively, the secondary unused gases can also flow through the first gas rotameter (245) and the second gas rotameter (250) within the first conduit (230) and the second conduit (235), respectively (step 40).

The flowrates of the secondary unused gases can be measured by the first gas rotameter (245) and the second gas rotameter (250) (step 40). In this aspect, the second flow valve (185) can be automatically or manually adjusted to regulate the flow of the carbon dioxide to the entrained air water jet at the outlet (155) of the nozzle (145) based on the measured flowrates by the first gas rotameter (245) and the second gas rotameter (250) (step 41). In some non-limiting embodiments, the flow of the carbon dioxide through the second feed line (175) to the entrained air water jet can be decreased or eliminated via automatic adjustment of the second flow valve (185) based on high flowrate readings from the first gas rotameter (245) and the second gas rotameter (250) (step 41). Conversely, in other non-limiting embodiments, the flow of the carbon dioxide through the second feed line (175) to the entrained air water jet can be increased via automatic adjustment of the second flow valve (185) based on low flowrate readings from the first gas rotameter (245) and the second gas rotameter (250) (step 41). In this context, carbon dioxide usage from the carbon dioxide gas supply source (340) can be optimized.

After the secondary unused gases flow pass through the second portion and the fourth portion of the first conduit (230) and the second conduit (235), respectively, the secondary unused gases can flow toward the entrained air water jet at the outlet (155) of the nozzle (145) via the respective opposing orifices of the second portion (130) of the confining tube (120), the first tapping line (160), and the second tapping line (165) (step 42). In this respect, the secondary unused gases are entrained in the entrained air water jet to obtain an entrained secondary unused gases air water jet as the entrained air water jet flows perpendicular to the two opposing orifices of the second portion (130) of the confining tube (120) (step 42). As a result, the concentrations of dissolved carbon dioxide and dissolved air are further increased in the entrained air water jet (step 42). The recycling of the secondary unused gases can also minimize or eliminate the need to supply additional carbon dioxide to the entrained air water jet from the second feed line (175) and the third feed line (330) thereby minimizing operation costs. The entrained secondary unused gases air water jet can have a large amount of undissolved air, a small amount of dissolved air, a large amount of undissolved carbon dioxide, and/or a small amount of dissolved carbon dioxide (step 42). Subsequently, steps 34-42 can be repeated continuously for the entrained secondary unused gases air water jet until the pH of the water (110) is within a predetermined range (step 43).

Desalination Process

Figure 5:
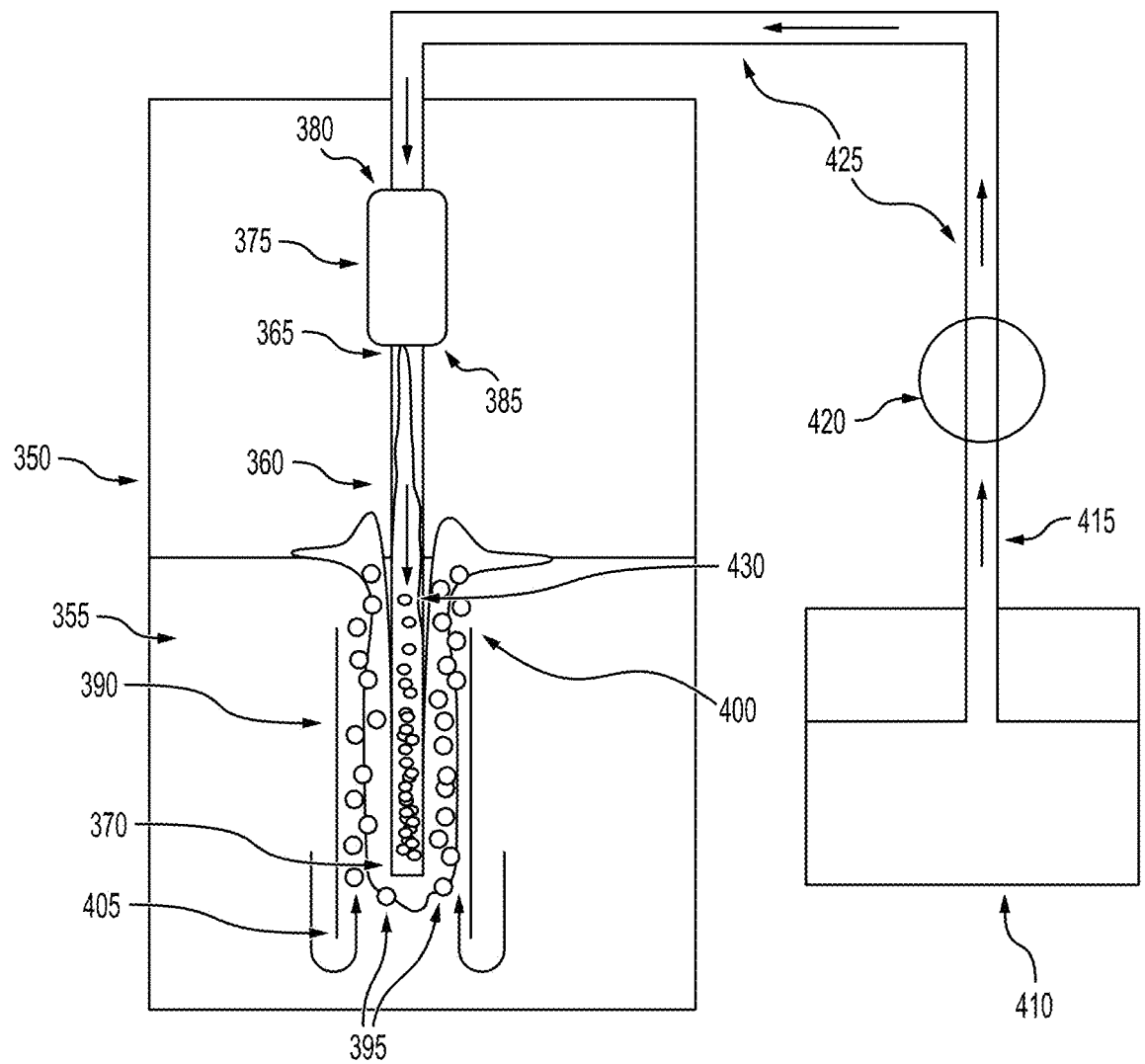
FIG. 5 depicts a desalination confined plunging liquid jet reactor system.

In an additional alternative embodiment, the present subject matter relates to a method of desalinating brine using a desalination confined plunging liquid jet reactor system (345) as shown in FIG. 5. In this regard, the desalination confined plunging liquid jet reactor system (345) can include a fluid tank (350) configured to contain unaerated water (355). The desalination confined plunging liquid jet reactor system (345) can also include a downcomer (360) defining a hollow column positioned within the fluid tank (350). The downcomer (360), also known as a confining tube, can include a primary portion (365) and a secondary portion (370). The secondary portion (370) of the downcomer (360) can be submerged in the unaerated water (355) in the fluid tank (350).

In an embodiment, the desalination confined plunging liquid jet reactor system (345) can additionally include a primary nozzle (375) located above the downcomer (360). The primary nozzle (375) can include an inlet channel (380) and an outlet channel (385). The primary portion (365) of the downcomer (360) can be connected to the outlet channel (385) of the primary nozzle (375). The outlet channel (385) of the primary nozzle (375) can be configured to produce a brine jet and entrain air in the brine jet to obtain entrained air brine jet as described herein.

In another embodiment, an annulus (390), which is a hollow column and also known as an annular riser, can be configured to partially enclose the downcomer (360) and be submerged in the unaerated water (355) as shown in FIG. 5. The annulus (390) can be configured to allow the unaerated water (355) from a surrounding area outside of the annulus (390) to be entrained and mixed with formed large water bubbles (395) leaving the secondary portion (370) of the downcomer (360) as described herein. The annulus (390) can include a primary section (400) and a secondary section (405). The primary section (400) of the annulus (390) can be located near the surface layer of the unaerated water (355). The secondary section (405) of the annulus (390) can be located in close proximity to the secondary portion (370) of the downcomer (360).

In an additional embodiment, the desalination confined plunging liquid jet reactor system (345) can include a brine source (410) as shown in FIG. 5. The brine source (410) can contain a brine solution and a fluorescent dye (hereinafter the combination of the brine solution and the fluorescent dye will be referred to as "brine"). An outlet line (415) can be in communication with the brine source (410). A primary pump (420) can be in communication with the outlet line (415). An inlet line (425) can be in communication with the primary pump (420). The inlet channel (380) of the primary nozzle (375) can be in communication with the inlet line (425). In this regard, the primary nozzle (375) can be configured to produce a brine jet at the outlet channel (385) of the primary nozzle (375) as described herein.

The method of desalinating brine using the desalination confined plunging liquid jet reactor system (345) can include continuously producing a brine jet at the outlet channel (385) of the primary nozzle (375) by continuously flowing the brine from the outlet line (415) to the primary nozzle (375) via the primary pump (420) (step 44). As the brine jet flows from the outlet channel (385) of the primary nozzle (375), air from the surrounding area (i.e., the headspace inside of the downcomer (360) near the outlet channel (385) of the primary nozzle (375)) adjacent to the outlet channel (385) of the primary nozzle (375) can be entrained in the brine jet to obtain an entrained air brine jet (step 45).

In an embodiment, most of the air during the entrainment step does not dissolve in the brine jet since this gas is sparingly soluble in brine. In this aspect, the entrained air brine jet can have a large amount of undissolved air and a small amount of dissolved air. The velocity of the entrained air brine jet can be regulated by adjusting the flowrate of the primary pump (420).

Next, the entrained air brine jet can flow into the unaerated water (355) in the fluid tank (350) thereby forming small brine water bubbles (430) as the entrained air brine jet penetrates into the unaerated water (355) (step 46). Each of the formed small brine water bubbles (430) can have the large amount of undissolved air and the small amount of dissolved air as mentioned above (step 46). The formed small brine water bubbles (430) can accumulate as they penetrate deeper into the unaerated water (355) (step 47).

At a certain depth within the unaerated water (355), the accumulated formed small brine water bubbles (430) can coalesce to form large brine water bubbles (395) (step 48). Each of the formed large brine water bubbles (395) can have the large amount of undissolved air and the small amount of dissolved air as mentioned above (step 48). In a particular non-limiting embodiment, the large brine water bubbles (395) can be formed as the accumulated formed small brine water bubbles (430) coalesce as they exit the secondary portion (370) of the downcomer (360) and begin ascending toward the surface layer of the unaerated water (355) within the annulus (390) (step 48). As the large brine water bubbles (395) leave the secondary portion (370) of the downcomer (360) and ascend within the annulus (390), the unaerated water (355) from the surrounding area outside of the annulus (390) can be entrained and mixed with the formed large brine water bubbles (395) (step 49). In this regard, the dissolved oxygen concentrations in the formed large brine water bubbles (395) and the water within the annulus (390) can be reduced during the entraining and mixing step. As a result, the dissolved oxygen concentration driving force can be restored thereby allowing more oxygen to be dissolved thereby further desalinating the brine.

As the large brine water bubbles (395) ascend within the annulus (390) and reach the surface layer of the unaerated water (355), the large brine water bubbles (395) can burst thereby releasing the large amount of undissolved air (step 50).

It is to be understood that the method of recycling unused gases in a water aeration process using the confined plunging liquid jet reactor system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of recycling unused gases in a water aeration process, the method comprising:
 providing a confined plunging liquid jet reactor system comprising:
  a fluid reservoir containing water;
  a first outlet line in communication with a bottom of the fluid reservoir;
  a pump in communication with the first outlet line;
  a first inlet line in communication with the pump;
  a nozzle located at a top portion of the fluid reservoir and in communication with the first inlet line;
  a hood located beneath the nozzle, wherein lower ends of the hood are located at a surface layer of the water;
 producing a water jet at an outlet of the nozzle by recirculating the water from the first outlet line through the first inlet to the nozzle via the pump;
 entraining air in the water jet as the water jet flows from the outlet of the nozzle to obtain an entrained air water jet;
 entraining oxygen in a first portion of the entrained air water jet to obtain an entrained oxygen air water jet;
 flowing the entrained oxygen air water jet into the water in the fluid reservoir thereby forming small water bubbles as the entrained oxygen air water jet penetrates into the water;
 forming large water bubbles as the small water bubbles ascend toward the surface layer of the water; and
 recycling unused gases under the hood by flowing the unused gases toward the outlet of the nozzle, thereby entraining the unused gases in the entrained air water jet.

2. The method of claim 1, wherein each of the formed small water bubbles and the formed large water bubbles contain undissolved air, dissolved air, undissolved oxygen, and dissolved oxygen.

3. The method of claim 2, wherein the formed large water bubbles burst at the surface layer of the water, thereby releasing the undissolved air and the undissolved oxygen from the formed large water bubbles.

4. The method of claim 3, wherein the released undissolved air and the released undissolved oxygen are contained within the hood and above the surface layer of the water.

5. The method of claim 4, wherein the unused gases comprise the released undissolved air and the released undissolved oxygen.

6. The method of claim 1, further comprising:
 prior to the step of entraining the oxygen in the first portion of the entrained air water jet, entraining nitrogen in a second portion of the entrained air water jet to obtain an entrained nitrogen air water jet;
 flowing the entrained nitrogen air water jet into the water in the fluid reservoir thereby forming small nitrogenous water bubbles as the entrained nitrogen air water jet penetrates into the water;
 forming large nitrogenous water bubbles as the small nitrogenous water bubbles ascend toward the surface layer of the water; and
 recycling additional unused gases under the hood by flowing the additional unused gases toward the outlet of the nozzle, thereby entraining the additional unused gases in the entrained air water jet.

7. The method of claim 6, wherein each of the formed small nitrogenous water bubbles and the formed large nitrogenous water bubbles contain undissolved air, dissolved air, undissolved nitrogen, and dissolved nitrogen.

8. The method of claim 7, wherein the formed large nitrogenous water bubbles burst at the surface layer of the water, thereby releasing the undissolved air and the undissolved nitrogen from the formed large nitrogenous water bubbles.

9. The method of claim 8, wherein the released undissolved air and the released undissolved nitrogen are contained within the hood and above the surface layer of the water.

10. The method of claim 9, wherein the additional unused gases comprise the released undissolved air and the released undissolved nitrogen.

11. The method of claim 6, wherein the step of entraining the nitrogen in the second portion of the entrained air water jet is halted when all initial dissolved oxygen is removed from the water in the fluid reservoir; and thereafter the step of entraining the oxygen in the first portion of the entrained air water jet is initiated.

12. The method of claim 11, wherein the confined plunging liquid jet reactor system further comprises:
 an oxygen probe for measuring dissolved oxygen concentration in the water in the fluid reservoir;
 a first feed line in communication with the outlet of the nozzle via a first tapping line for supplying the nitrogen to the second portion of the entrained air water jet during the step of entraining the nitrogen;

a first flow valve located in the first feed line for regulating a flow of the nitrogen to the second portion of the entrained air water jet;

a second feed line in communication with the outlet of the nozzle via a second tapping line for supplying the oxygen to the first portion of the entrained air water jet during the step of entraining the oxygen; and a second flow valve located in the second feed line for regulating a flow of the oxygen to the first portion of the entrained air water jet;

wherein the first flow valve and the second flow valve are each in communication with the oxygen probe.

13. The method of claim 12, wherein the step of entraining the nitrogen comprises opening the first flow valve to allow the nitrogen in the first feed line to flow to the second portion of the entrained air water jet.

14. The method of claim 13, further comprising:

closing the first flow valve when the oxygen probe is reading a predetermined low range of oxygen, thereby indicating that all of the initial dissolved oxygen is removed from the water in the fluid reservoir; and opening the second flow valve to allow the oxygen in the second feed line to flow to the first portion of the entrained air water jet during the step of entraining the oxygen.

15. The method of claim 12, wherein the hood further comprises:

a first conduit and a second conduit;

a first portion of the first conduit is in communication with a top portion of the hood and a second portion of the first conduit is in communication with a portion of the first tapping line;

a first gas rotameter located in the first conduit between the first portion and the second portion of the first conduit;

a third portion of the second conduit is in communication with the top portion of the hood and a fourth portion of the second conduit is in communication with a portion of the second tapping line;

a second gas rotameter located in the second conduit between the third portion and the fourth portion of the second conduit; and wherein the first gas rotameter and the second gas rotameter are in communication with the first flow valve and the second flow valve, respectively.

16. The method of claim 15, further comprising:

flowing the unused gases and the additional unused gases from under the hood into the first gas rotameter and the second gas rotameter, via the first conduit and the second conduit, respectively, through the first tapping line and the second tapping line, respectively, and to the outlet of the nozzle; and regulating the flow of the nitrogen and the oxygen to the second portion and the first portion of the entrained air water jet, respectively, at the outlet of the nozzle via the first flow valve and the second flow valve, respectively, based on flowrates of the unused gases and the additional unused gases measured by the first gas rotameter and the second gas rotameter, respectively.

17. A confined plunging liquid jet reactor system comprising:

a fluid reservoir configured to contain water;

a first outlet line in communication with a bottom of the fluid reservoir;

a pump in communication with the first outlet line;

a first inlet line in communication with the pump;

a nozzle, located at a top portion of the fluid reservoir and in communication with the first inlet line, configured to produce a water jet and entrain air in the water jet to obtain an entrained air water jet at an outlet of the nozzle;

a hood located beneath the nozzle, wherein lower ends of the hood are located at a surface layer of the water;

an oxygen probe configured to measure dissolved oxygen concentration in the water in the fluid reservoir;

a first feed line in communication with the outlet of the nozzle via a first tapping line and configured to supply nitrogen to the entrained air water jet;

a first flow valve located in the first feed line configured to regulate a flow of the nitrogen to the entrained air water jet;

a second feed line in communication with the outlet of the nozzle via a second tapping line and configured to supply oxygen to the entrained air water jet; and a second flow valve located in the second feed line configured to regulate a flow of the oxygen to the entrained air water jet;

wherein the first flow valve and the second flow valve are each in communication with the oxygen probe.

18. The system of claim 17, wherein the first flow valve and the second flow valve are configured to open and close based on dissolved oxygen concentration readings in the water in the fluid reservoir via the oxygen probe.

19. The system of claim 17, wherein the hood further comprises:

a first conduit and a second conduit;

a first portion of the first conduit in communication with a top portion of the hood and a second portion of the first conduit in communication with a portion of the first tapping line;

a first gas rotameter located in the first conduit between the first portion and the second portion of the first conduit;

a third portion of the second conduit in communication with the top portion of the hood and a fourth portion of the second conduit in communication with a portion of the second tapping line;

a second gas rotameter located in the second conduit between the third portion and the fourth portion of the second conduit; and wherein the first gas rotameter and the second gas rotameter are in communication with the first flow valve and the second flow valve, respectively.

20. The system of claim 19, wherein the first flow valve and the second flow valve are configured to regulate the flow of the nitrogen and the oxygen, respectively, to the entrained air water jet at the outlet of the nozzle based on flowrates of the unused gases and the additional unused gases measured by the first gas rotameter and the second gas rotameter, respectively.

\* \* \* \* \*